Oct. 2, 1923.

B. E. LAMBERT

UPHOLSTERY FOR SEAT BACKS

Filed Nov. 24, 1919

1,469,263

Witness:

Inventor
Brazil E. Lambert
By Attorneys

Patented Oct. 2, 1923.

1,469,263

UNITED STATES PATENT OFFICE.

BRAZIL E. LAMBERT, OF FLINT, MICHIGAN, ASSIGNOR TO GENERAL MOTORS CORPORATION, OF DETROIT, MICHIGAN, A CORPORATION OF DELAWARE.

UPHOLSTERY FOR SEAT BACKS.

Application filed November 24, 1919. Serial No. 340,097.

*To all whom it may concern:*

Be it known that I, BRAZIL E. LAMBERT, a citizen of the United States, and a resident of Flint, county of Genesee, and State of Michigan, have invented certain new and useful Improvements in Upholstery for Seat Backs, of which the following is a full, clear, concise, and exact description, such as will enable others skilled in the art to which the invention relates to make and use the same, reference being made therein to the accompanying drawings, which form a part of this specification.

My invention relates to the upholstering of the seats of motor driven and other types of vehicles, and particularly to springs located within the upholstery at the back of the seat of the vehicle and which springs are employed to impart resiliency to the upholstery.

Heretofore in providing upholstery for the back of a vehicle seat it has been extremely difficult to secure a neatly fitting fabric cover for the springs, especially so as regards the uppermost row of springs; and the principal object of my invention is to provide a form of spring for use in upholstering the backs of vehicle seats by the use of which a better appearance may be secured, particularly at the upper end or upper edge of the back, and whereby a neat and well appearing top roll is provided at the upper end of the back upholstery where the same curves backward and is secured to the rear frame work of the seat structure, which frame work serves as a support for the springs located within the upholstered back, as will be appreciated.

My invention is regarded as including both a spring for use in upholstering motor vehicle backs and in other locations considered as a separate article of manufacture or device, as well also as a seat back regarded as a unitary structure and after the same has been upholstered by the use of springs the uppermost or top row of which are made in accordance with my invention, regarded in its other aspect as including the spring only as an article of manufacture separate and apart from the finished back of the seat.

Referring to the drawing accompanying and forming a part of this specification and wherein the preferred embodiment of my invention is illustrated:

Figure 1:
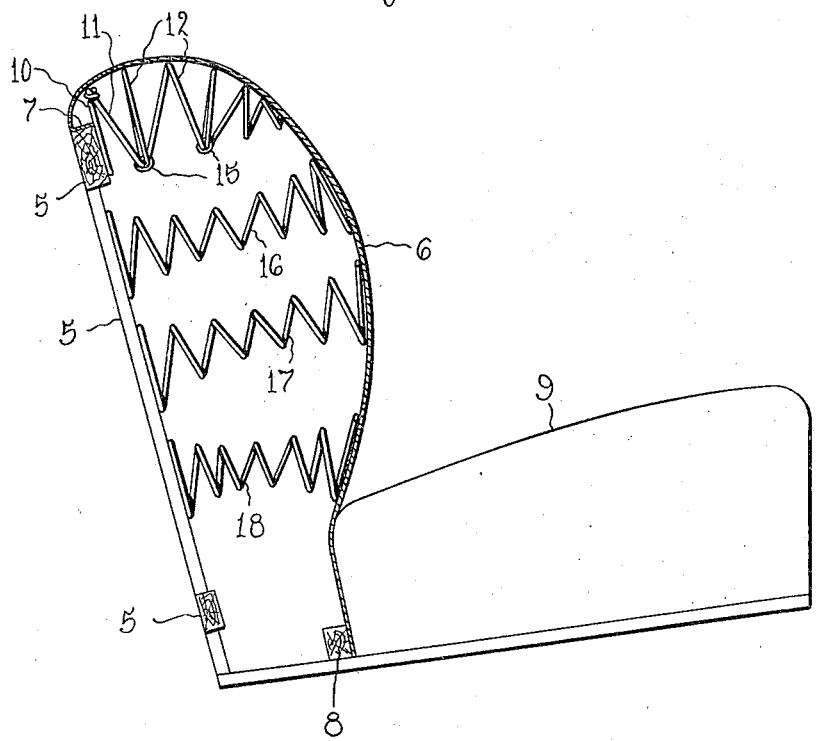
Figure 1 is a view showing a section of the back of a motor vehicle seat upholstered in accordance with my invention, upon a vertical plane.

Referring now to the drawing, the reference numeral 5 designates various of the parts of a frame or support whereby the springs employed in upholstering a back in accordance with my invention are carried, one end of each of the several springs being fixedly secured to said back while the forward free ends of said springs are covered by the upholstering proper of the back, the same comprising a suitable fabric 6 extending over and contacting with the free ends of the springs. The upper end of said cover or fabric is fixedly secured to the top frame member 5 at the point 7, while the lower end thereof is secured to a transverse bar 8 of the seat frame structure regarded in its entirety. The seat portion proper of the seat is designated by the reference numeral 9, although the particular construction of said portion of the seat is in no way involved in the invention to which this application relates and is therefore not illustrated in detail.

Figure 2:
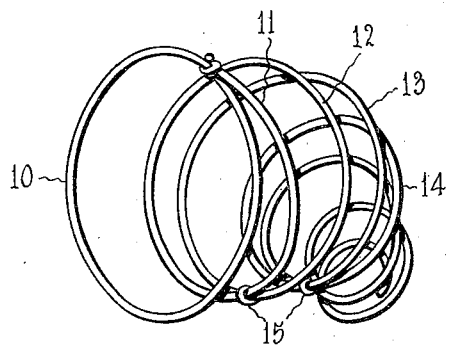
Figure 2 is a perspective view showing one of the springs employed in forming the top row of springs of the back.

Figure 2 shows one of a plurality of coiled springs employed in the top row of springs located within the back of the seat, said springs being spaced apart from one another along the upper transverse bar of the rear seat frame 5, as will be appreciated. These springs are all, ordinarily, alike, and each of them is made up of a plurality of convolutions 10, 11, 12, 13, 14, etc., substantially circular in form and of progressively decreasing diameters, the number of convolutions or coils employed in each single spring being obviously a matter of secondary importance and determined by the resilient qualities to be secured in the finished back. The largest one of these convolutions is secured directly to the back frame, while the front ends of the springs are free to yield to the pressure of a person occupying the seat, as will be understood.

In order to impart a downwardly curved form or outline to the separate springs of the upper row of springs here referred to and secure a better appearance at the upper portion of the fabric 6, to thereby provide a better appearing top roll for the back upholstery, successive ones of the convolutions or coils of the spring above referred to are secured together at the common points where their peripheries or circumferences may be made to contact by pressing the coils toward one another; the securing of the said coils being preferably accomplished by means of clips 15 embracing or extending about the contacting portions of the coils, as clearly shown in Figures 1 and 2. In some cases it will be sufficient if two only of the coils or convolutions of the springs in question are fastened together as by means of the securing members 15, while in other cases it will be necessary to secure two or more pairs of convolutions together in each of the separate springs which collectively form the top row of springs within the back of the seat.

The back upholstery in the concrete form in which it is used obviously includes other rows of springs 16, 17, 18, as many as may be deemed necessary or desirable, arranged below the uppermost row hereinbefore referred to and the free ends of all of which are covered by the flexible fabric sheet 6. These other springs, however, may be of the ordinary form at present used in upholstering seats and for equivalent purposes, and are in no way involved in this present invention except in so far as some such springs are included in the more comprehensive invention made by me and to which this application relates; and which invention, as hereinbefore stated, includes a complete seat back having other springs located beneath and used in combination with a row of top springs having a downwardly drooping and curved outline produced in substantially the manner hereinbefore explained in order to provide a well appearing top roll at the upper end of the back upholstery.

It will be appreciated that the illustration in the drawing is conventional as regards the fabric covering upon the exposed surface of the back upholstery regarded in its entirety, and that the same comprehends all that portion or part of the upholstery which is supported by or upon the outer free ends of the springs carried by the spring supporting frame. Ordinarily a mattress of cotton or other material of considerable thickness is interposed between the outer ends of the springs and the outer exposed leather or other fabric covering, and the upholstery is suitably tufted; all, however, as is common and well understood in the upholstering art.

Having thus described and explained my invention, I claim and desire to secure by Letters Patent:

1. In an upholstered seat back, a suitable spring supporting back frame; a top row of coil springs each having a plurality of convolutions or coils substantially circular in form and of progressively decreasing diameter and in which two successive ones of said coils are secured together at a common point; other coil springs carried by said back frame and located below said top springs; and a fabric covering secured to said back frame and extending over the free ends of said several springs.

2. In an upholstered seat back, a suitable spring supporting back frame; a top row of coil springs each having a plurality of convolutions or coils substantially circular in form and in which two successive ones of said coils are secured together at a common point; other coil springs carried by said back frame and located below said top springs; and a fabric covering extending over the free ends of said several springs.

In testimony whereof I affix my signature.

BRAZIL E. LAMBERT.